United States Patent

Cornish et al.

[11] Patent Number: 6,021,248
[45] Date of Patent: Feb. 1, 2000

[54] OPTICAL WAVEGUIDE ATTENUATION

[75] Inventors: Andrew Cornish, Swindon; James Stuart McKenzie, Uxbridge, both of United Kingdom

[73] Assignee: Bookham Technology Limited, United Kingdom

[21] Appl. No.: 09/116,082

[22] Filed: Jul. 15, 1998

[30] Foreign Application Priority Data

Jun. 4, 1998 [GB] United Kingdom .................. 9812036

[51] Int. Cl.$^7$ ..................................................... G02B 6/00
[52] U.S. Cl. ........................................................... 385/147
[58] Field of Search ..................... 385/33, 37, 43, 385/50, 147, 131, 132, 95; 156/345; 333/122, 21 A, 21 R, 26, 33, 34, 35; 372/7, 43, 49, 107, 108

[56] References Cited

U.S. PATENT DOCUMENTS

| | | | |
|---|---|---|---|
| 3,774,987 | 11/1973 | Boivin | 385/37 |
| 4,848,219 | 7/1989 | Seino et al. | 385/90 |
| 4,891,614 | 1/1990 | De Ronde | 333/122 |
| 5,111,111 | 5/1992 | Stevens et al. | 156/345 |
| 5,321,714 | 6/1994 | Paoli | 372/50 |

FOREIGN PATENT DOCUMENTS

| | | | |
|---|---|---|---|
| 2264792 | 9/1993 | United Kingdom | G02B 6/24 |
| 9607114 | 3/1996 | WIPO | G02B 5/28 |

*Primary Examiner*—Akm E. Ullah
*Attorney, Agent, or Firm*—Webb Ziesenheim Logsdon Orkin & Hanson, P.C.

[57] ABSTRACT

A turntable optical transmission circuit has a light source forming an input to a waveguide, a detector detecting light output from the waveguide, a comparator for comparing the output with a predetermined value to generate a difference signal and a waveguide trimmer for changing the waveguide transmission in dependence on the difference signal until the output matches the predetermined value.

19 Claims, 2 Drawing Sheets

OPTICAL WAVEGUIDE ATTENUATION

The invention relates to methods and apparatus for optical waveguide attenuation.

BACKGROUND OF THE INVENTION

In optical transmission devices including optical waveguides, it may be necessary to measure and modify attenuation in an optical waveguide and the relationship between the operating parameters of devices used at an input and an output of the waveguide. Testing of equipment using such optical waveguides and the setting of input or output equipment depending on the attenuation characteristics may well be costly in both time and expense.

It is an object of the present invention to provide an improved method and apparatus of matching the attenuation of an optical waveguide with the operating characteristics of apparatus used at the input and/or output ends of the waveguide.

SUMMARY OF THE INVENTION

The invention provides a method of tuning optical transmission characteristics of an optical transmission circuit including an optical waveguide, which method comprises supplying light to an input of the waveguide, detecting the amount of output light emitted from the waveguide, comparing the light output with a predetermined value of output to generate a difference signal, driving a waveguide trimmer to change the waveguide transmission characteristics at a selected position along the waveguide, said driving of the waveguide trimmer being responsive to the difference signal so that the waveguide trimmer is operated to continue change in the transmission characteristics while detecting the amount of light output until the light output value matches said predetermined value.

Said predetermined value may be set in dependence on an input value of a light source used to provide the light input to the waveguide.

Conveniently trimming of the waveguide is effected by use of a trimming laser operated to form a cut in the waveguide. Devices other than a laser may be used.

The cut may be acute angle to the length of the waveguide to reduce reflection towards the input of the waveguide.

Preferably the waveguide is formed in an integrated silicon chip.

The waveguide may be formed as a rib in a silicon layer formed over a layer of silicon dioxide.

The waveguide may form part of an optical transmission path between a light source and an optical fibre, said detecting of output light comprising detecting light entering said optical fibre.

The trimming of the waveguide may be effected to result in a desired value of output light in the optical fibre relative to an input value operating the light source.

The waveguide may form part of an optical transmission path between a light source and a monitor device for monitoring light output from the light source.

The trimming of the waveguide may be effected to result in a desired value of monitor output signal relative to an input value operating the light source.

Preferably said monitor device comprises a photodiode.

Conveniently the input to the waveguide is generated by a laser device having a light output related to an electrical input signal supplied to the laser.

Preferably said waveguide forms part of a waveguide network connecting a light source to both an optical fibre and to a monitor device, said method comprises trimming one waveguide region in dependence on light detected at the optical fibre to obtain a desired value of light entering the fibre, and trimming a different waveguide region which leads to the monitor but is independent of the path to the optical fibre, thereby obtaining a desired output from the monitor.

Conveniently the waveguide network includes a first waveguide region forming a common path to both the optical fibre and the monitor and a second region which provides independent transmission paths to the monitor and to the optical fibre, said method including forming one trimming in the first waveguide region and a second trimming in said second waveguide region.

In one embodiment said first waveguide region is formed by a part of a first waveguide and said second waveguide region comprises two independent optical paths, one being formed as an extension of said first waveguide and the second being formed by a second waveguide optically coupled to the first waveguide.

The invention also provides apparatus for tuning the optical transmission characteristics of an optical transmission circuit including an optical waveguide, which apparatus comprises a power supply for connection to a light source which forms an input to an optical waveguide, a light level detector for detecting output light emitted from the waveguide, a comparator for comparing the light output with a predetermined value to generate a difference signal, a waveguide trimmer for changing the waveguide transmission characteristics at a position intermediate the ends of the waveguide, and drive circuitry for operating the waveguide trimmer, said drive circuitry being coupled to said comparator and arranged to operate the waveguide trimmer until the light output value matches said predetermined value.

The apparatus may be arranged for trimming a waveguide network interconnecting a light source with an optical fibre and a monitor, which apparatus comprises a first detector for detecting a light level reaching the optical fibre, a second detector for detecting an output signal level from the monitor, control circuitry responsive to output signals from the first and second detectors and comparing them with predetermined values and drive circuitry responsive to an output of said control circuitry for operating a trimming laser for effecting two trimming operations in the waveguide network in order to achieve required levels both for the output of the monitor and light entering the optical fibre.

DESCRIPTION OF THE PREFERRED EMBODIMENTS

Figure 1:
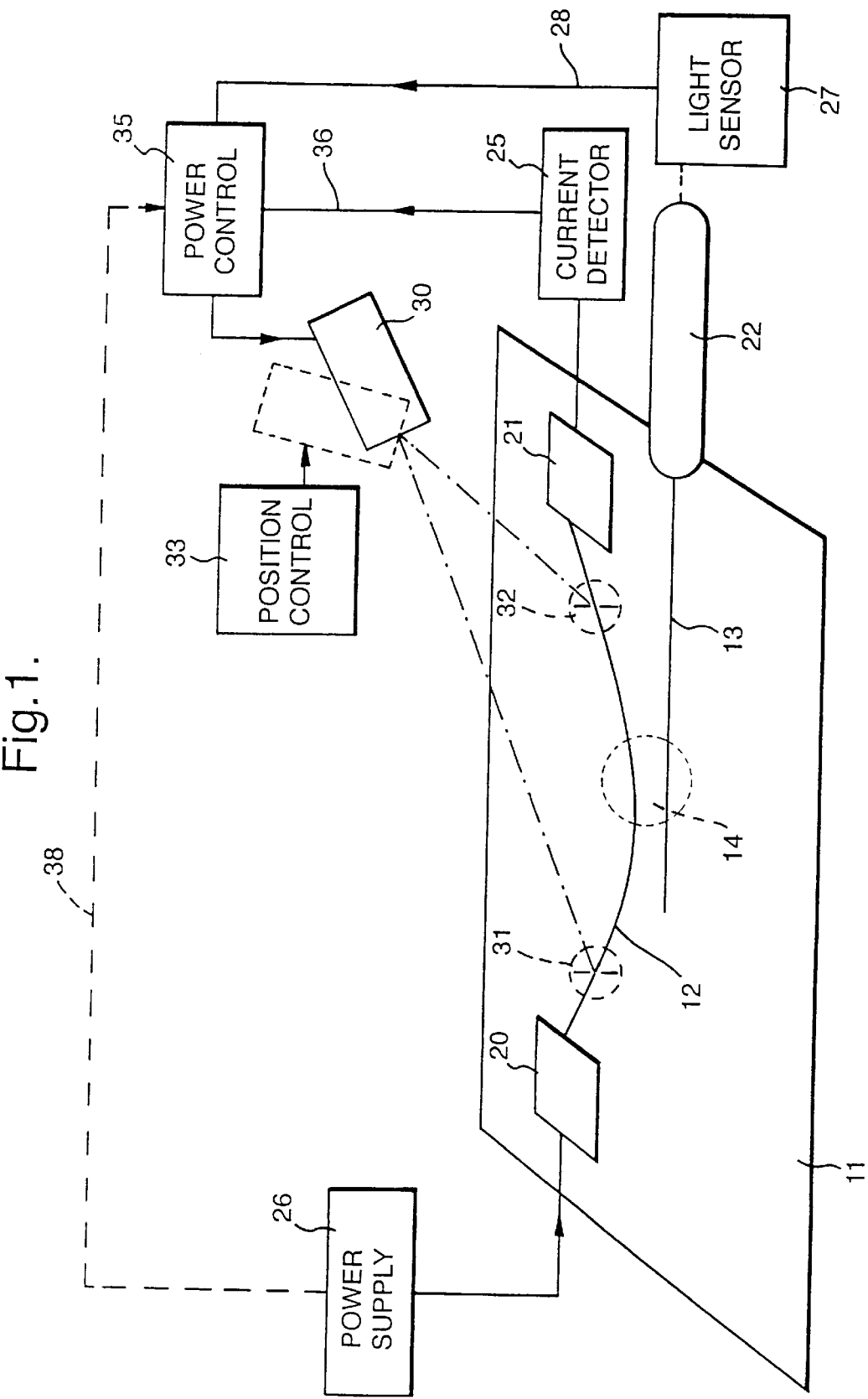
FIG. 1 is a schematic view of one embodiment of the invention for use in varying the attenuation of an optical waveguide.
Figure 2:
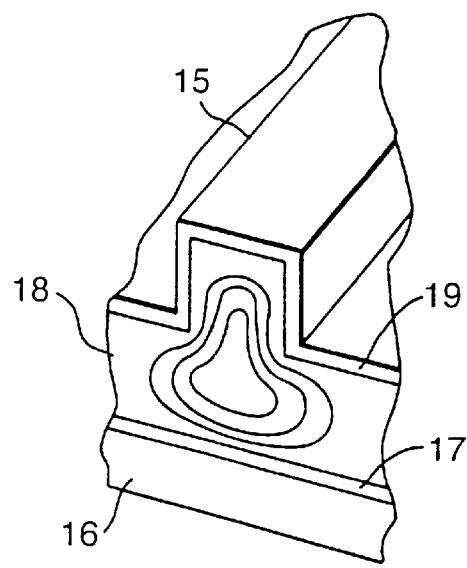
FIG. 2 shows in more detail a waveguide structure which may be used in the apparatus of FIG. 2.

The embodiment shown in FIG. 1 relates to the tuning of optical attenuation in a waveguide formed on a substrate which may be a silicon-on-insulator chip 11. The waveguide forms part of a waveguide network consisting of a first waveguide 12 and a second waveguide 13. The two waveguides are optically coupled in a region 14. Each of the waveguides 12 and 13 is formed as a single mode silicon waveguide structure consisting of a rib 15 as shown in FIG. 2. The chip 11 is formed as a monolithic structure having a silicon substrate 16 covered by a silicon dioxide layer 17. A further silicon layer 18 extends into the rib 15 with a silicon dioxide coating 19 extending over the silicon 18.

Mounted on the chip 11 is a light source 20 in the form of an electrically driven laser diode as well as a photodiode 21 acting as a monitor by producing an output current depending on the light generated by the laser 20. An external optical connection from the chip is provided by an optical fibre 22. The chip may act as a light transmitter for light which is generated by the laser 20 and output through the fibre 22. In that case light from the source 20 passes firstly through the waveguide 12 and then through the optical coupling 14 into the second waveguide 13 before being output through the fibre 22. The chip may also act as a receiver in which case light received through the fibre 22 will be directed along the waveguide 13 and may be received by a light detector (not shown) coupled to an end of the waveguide 13 from the fibre 22.

To monitor the light output from the laser 20, light is directed along the waveguide 12 to the photodiode 21 which generates an output current detected by a current detector 25. The power to the laser 20 is determined by an adjustable power supply 26. When the chip is being used to output light, light passing through the fibre 22 from the light source 20 is detected by a light sensor 27 which provides a signal on line 28 indicating the amount of light entering the fibre 22.

Due to variations in the operating characteristics of the laser 20 and the photodiode 21 as well as variations in the attenuation in the waveguides 12 and 13, considerable variations may occur in the relationship between currents detected by the current detector 25 for a given electrical supply to the laser 20 and similarly considerable variations occur in the light entering the fibre 22 in relation to the selected power supply for the laser 20. This embodiment provides apparatus and a method for tuning products so as to achieve accurate relationships between drive supply for the laser 20 and the output of a photodiode 21 as well as for the relationship between the drive supply to the laser 20 and the amount of light entering the fibre 22. This allows for substantially increased yield for a predetermined set of specifications in products by tuning the waveguide attenuation to permit the desired relationships between the laser input and the two outputs referred to above.

A trimming laser 30 is provided to trim the attenuation of the waveguide 12 by forming cuts in the rib at positions marked 31 and 32 in FIG. 1. The position of the trimming laser 30 can be varied as shown under the control of a position control unit 33. Power to the trimming laser 30 is varied under the control of a power control 35 arranged to receive an input from line 28 as well as an input on line 36 from the current detector 25. The power control unit 35 may also be responsive to the setting of the laser power supply 26 by a signal indicated on broken line 38. The wavelength of radiation from the trimming laser 30 is sufficiently different from that of the laser 20 so that light from the trimming laser 30 does not supplement the detected level of light transmitted through the waveguide to either the optic fibre or photo diode.

In use, laser 20 is powered with a preset driving current from the power supply 26. The amount of light entering the fibre 22 is detected by the light sensor 27. The power control 35 compares the signal on line 28 in relation to the power supply setting detected from line 38. It then operates the laser 30 which is directed by the position control 33 so that the trimming beam from the laser impinges on waveguide 12 at position 31. So long as the power control 35 senses a difference between the signal level on line 28 and a predetermined level required for light in the fibre 22, laser 30 will continue to cause damage to the waveguide 12 in the region 31 until the signal on line 28 reaches the required level corresponding to a required ratio of input current to the laser 20 and light output through the fibre 22. The laser 30 is then switched off. At that point the position control 33 adjusts the position of laser 30 so that the laser beam is directed to the region 32 on waveguide 12. The value of monitor current in line 36 is then sensed by the power control 35 and compared with a preset value in relation to the drive current of the laser 20. If a difference is detected then the power control 35 switches on laser 30 to trim the attenuation of waveguide 12 in region 32. The trimming is continued while continuing to sense the monitor current on line 36 until the monitor current indicates that the output of the photodiode 21 has the correct ratio with the input current of the laser 20. At that point the laser 30 is switched off. The product has then been tuned to provide the correct ratio of output signals both from the monitor 21 and the fibre 22 in relation to the drive current used for the light source laser 20.

Figure 3:
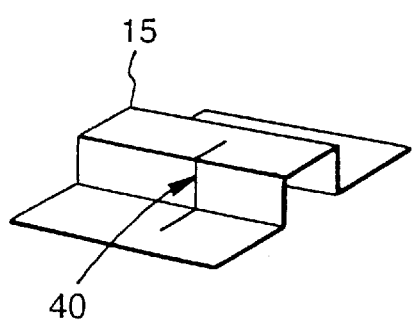
FIG. 3 shows one form of cut which may be formed in a waveguide trimming operation in use of the apparatus of FIG. 1.
Figure 4:
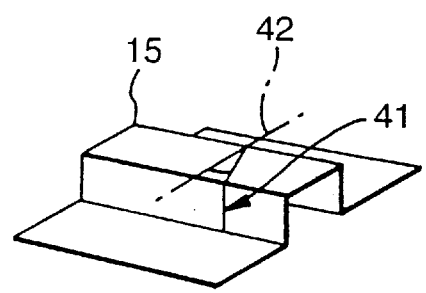
FIG. 4 shows an alternative cut which may be used in a trimming operation in use of the apparatus of FIG. 1.

The laser 30 may be arranged to form a cut 40 as indicated in FIG. 3 which extends at right angles across the length of the rib 15. Alternatively the laser 30 may be directed at the waveguide 12 so as to produce an angled cut 41 as shown in FIG. 4. In this case the cut 41 extends transversely across the rib 15 at an acute angle relative to a line 42 perpendicular to the length of the rib 15. With such an angled cut formed in the waveguide wall, light reflected towards the laser source 20 is reduced. The cut may be formed across the top of the rib or alternatively in the side wall of the rib.

It will be seen that by effecting two laser trimming operations in sequence, the first trimming at location 31 affects the attenuation of light passing both to the photodiode 21 and to the optic fibre 22. Once attenuation has been carried out at point 31 to achieve the correct output through the fibre 22 it is necessary that the second trimming operation at region 32 affects only the light passing to the photodiode 21 and does not cause any further change in the light reaching the fibre optic 22.

The invention is not limited to the details of the foregoing example. For instance, instead of cuts as shown in FIGS. 3 and 4 other waveguide damage, such as abrasion, may be used to vary the transmission through the waveguide. Such abrasion may result from laser damage to the substrate close to the waveguide.

Although the example illustrates an integrated silicon on insulator structure for formation of the waveguide, other structures may be used. Instead of a rib waveguide, a buried guide may be formed. The invention may be used on both transmitters and receivers of light and may be used in other optical planar waveguide circuits to control variation in attenuation through an optical transmission circuit incorporating a waveguide. It may be used in the final test of attenuators, dense wavelength division multiplexors and multiway transmitters. Instead of using a trimming laser 30 other trimming techniques to vary the attenuation may include optical, chemical, mechanical and focused energy techniques.

All the above described embodiments provide a method of actively tuning attenuation in a waveguide circuit while continuing to monitor light received at an output from the waveguide. The light detection at the output is tuned to detect only the radiation wavelength of the laser source 20 and not to include any light of the wavelength used by the trimming laser 30.

In the example of FIG. 1 the first trimming operation to vary the light transmitted to the detector 27 is carried out on the waveguide 12 in the region 31. However, as an alternative, this first trimming operation may be carried out on waveguide 13 leading to the optic fibre 22.

The light source used may be a light emitting diode (LED device) in place of the laser 20.

We claim:

1. A method of tuning optical transmission characteristics of an optical transmission circuit including an optical waveguide, which method comprises supplying light to an input of the waveguide, detecting the amount of output light emitted from the waveguide, comparing the light output with a predetermined value of output to generate a difference signal, driving a waveguide trimmer to change the waveguide transmission characteristics at a selected region along the waveguide, said driving of the waveguide trimmer being responsive to the difference signal so that the waveguide trimmer is operated to continue change in the transmission characteristics while detecting the amount of light output until the light output value matches said predetermined value.

2. A method according to claim 1 in which said predetermined value is set in dependence on an input value of a light source used to provide the light input to the waveguide.

3. A method according to claim 1 in which trimming of the waveguide is effected by use of a trimming laser operated to form a cut in a wall of the waveguide.

4. A method according to claim 3 in which the cut is at an acute angle to the length of the waveguide to reduce reflection towards the input of the waveguide.

5. A method according to claim 1 in which the waveguide is integrated on a substrate.

6. A method according to claim 5 in which the substrate is a silicon chip.

7. A method according to claim 5 in which the waveguide is formed as a rib in a silicon layer formed over a layer of silicon dioxide.

8. A method according to claim 1 in which the waveguide forms part of an optical transmission path between a light source and an optical fibre, said detecting of output light comprising detecting light entering said optical fibre.

9. A method according to claim 8 in which the trimming of the waveguide is effected to result in a desired value of output light in the optical fibre relative to an input value operating the light source.

10. A method according to claim 1 in which the waveguide forms part of an optical transmission path between a light source and a monitor device for monitoring light output from the light source.

11. A method according to claim 10 in which the trimming of the waveguide is effected to result in a desired value of monitor output signal relative to an input value operating the light source.

12. A method according to claim 11 in which said monitor device comprises a photodiode.

13. A method according to claim 1 in which the input to the waveguide is generated by a laser device having a light output related to an electrical input signal supplied to the laser.

14. A method according to claim 1 in which the light source forming an input to the waveguide is an LED device.

15. A method according to claim 1 in which said waveguide forms part of a waveguide network connecting a light source to both an optical fibre and to a monitor device, said method comprises trimming one waveguide region in dependence on light detected at the optical fibre to obtain a desired value of light entering the fibre, and trimming a different waveguide region which leads to the monitor but is independent of the path to the optical fibre, thereby obtaining a desired output from the monitor.

16. A method according to claim 15 in which the waveguide network includes a first waveguide region forming a common path to both the optical fibre and the monitor and a second region which provides independent transmission paths to the monitor and to the optical fibre, said method including forming one trimming in the first waveguide region and a second trimming in said second waveguide region.

17. A method according to claim 16 in which said first waveguide region is formed by a part of a first waveguide and said second waveguide region comprises two independent optical paths, one being formed as an extension of said first waveguide and the second being formed by a second waveguide optically coupled to the first waveguide.

18. Apparatus for tuning the optical transmission characteristics of an optical transmission circuit including an optical waveguide, which apparatus comprises a power supply for connection to a light source which forms an input to an optical waveguide, a light level detector for detecting output light emitted from the waveguide, a comparator for comparing the light output with a predetermined value to generate a difference signal, a waveguide trimmer for changing the waveguide transmission characteristics at a position intermediate the ends of the waveguide, and drive circuitry for operating the waveguide trimmer, said drive circuitry being coupled to said comparator and arranged to operate the waveguide trimmer until the light output value matches said predetermined value.

19. Apparatus for trimming a waveguide network interconnecting a light source with an optical fibre and a monitor, which apparatus comprises a first detector for detecting a light level reaching the optical fibre, a second detector for detecting an output signal level from the monitor, control circuitry responsive to output signals from the first and second detectors and comparing them with predetermined values and drive circuitry responsive to an output of said control circuitry for operating a trimming laser for effecting two trimming operations in the waveguide network in order to achieve required levels both for the output of the monitor and light entering the optical fibre.

* * * * *

UNITED STATES PATENT AND TRADEMARK OFFICE
CERTIFICATE OF CORRECTION

PATENT NO. : 6,021,248
DATED : February 1, 2000
INVENTOR(S) : Andrew Cornish et al.

It is certified that error appears in the above-identified patent and that said Letters Patent is hereby corrected as shown below:

Title Page, [56] References Cited, under U.S. PATENT DOCUMENTS, insert:
```
--5,118,923   6/1992    Farina................... 250/205
  5,195,163   3/1993    Burns et al.............. 385/132
  5,673,344   9/1997    Li et al................. 385/48--.
```

Title Page, [56] References Cited, insert:
 --OTHER DOCUMENTS
 Chen, Antao et al., XP-000722983, entitled "Trimming of Polymer Waveguide Y-Junction by Rapid Photobleaching for Tuning the Power Splitting Ratio", 2 pp. (2-sided), November 1997.

Seiji, Terai, Patent Abstracts of Japan, Publ. No. 58107504, entitled "PRODUCTION OF OPTICAL FIBER HAVING LIGHT ATTENUATING PART", June 27, 1983, 1 p.--.

Signed and Sealed this

Twentieth Day of February, 2001

*Attest:*

NICHOLAS P. GODICI

*Attesting Officer*       *Acting Director of the United States Patent and Trademark Office*